US011774951B2

(12) United States Patent
Shao et al.

(10) Patent No.: US 11,774,951 B2
(45) Date of Patent: Oct. 3, 2023

(54) PRODUCTION LINE ADAPTATION METHODS BASED ON INDUSTRIAL INTERNET OF THINGS, SYSTEMS AND STORAGE MEDIUMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Yongzeng Liang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/045,171

(22) Filed: Oct. 9, 2022

(65) Prior Publication Data
US 2023/0053412 A1  Feb. 23, 2023

(30) Foreign Application Priority Data
Jun. 28, 2022 (CN) .......................... 202210738567.3

(51) Int. Cl.
*G05B 19/418* (2006.01)
(52) U.S. Cl.
CPC ... *G05B 19/4185* (2013.01); *G05B 19/41845* (2013.01); *G05B 19/41865* (2013.01)
(58) Field of Classification Search
CPC .......... G05B 19/4185; G05B 19/41845; G05B 19/41865; G05B 2219/32252;
(Continued)

(56) References Cited

U.S. PATENT DOCUMENTS

2002/0107600 A1* 8/2002 Crampton ............. G06Q 10/06
700/99
2010/0023147 A1* 1/2010 Knipfer ................ G06Q 10/087
700/96
(Continued)

FOREIGN PATENT DOCUMENTS

CN  109352412 A  2/2019
CN  109709915 A  5/2019
(Continued)

OTHER PUBLICATIONS

A. Azab, H. ElMaraghy, P. Nyhuis, J. Pachow-Frauenhofer, M. Schmidt, Mechanics of change: A framework to reconfigure manufacturing systems, CIRP Journal of Manufacturing Science and Technology, vol. 6, Issue 2, 2013, pp. 110-119 (Year: 2013).*
(Continued)

*Primary Examiner* — Christopher E. Everett
(74) *Attorney, Agent, or Firm* — METIS IP LLC

(57) ABSTRACT

This present disclosure provides a production line adaptation method, system and medium based on the Industrial Internet of Things. The method comprises: an instruction generation module configured to generate an adaptation instruction based on production item data of a production line required by a production item input by a user; a production adaptation module configured to generate a target adaptation scheme based on the adaptation instruction; and obtain an adaptation result by adapting the plurality of target production lines based on the target adaptation scheme; a feedback module configured to determine feedback results according to the adaptation results; and a process configuration module configured to perform process configuration on the plurality of target production lines to obtain the production line required by the production item in response to the feedback results indicating that the adaptation is successful.

8 Claims, 7 Drawing Sheets

(58) Field of Classification Search
CPC .... Y02P 90/02; G06Q 10/0631; G06Q 50/04; G16Y 10/25; G16Y 20/00; G16Y 40/10; G16Y 40/30
See application file for complete search history.

(56) References Cited

U.S. PATENT DOCUMENTS

| | | | | |
|---|---|---|---|---|
| 2014/0343732 | A1* | 11/2014 | Obermeier | H04L 63/20 700/275 |
| 2016/0148135 | A1* | 5/2016 | Herron | G06Q 10/06312 705/7.22 |
| 2020/0209817 | A1 | 7/2020 | Lee et al. | |
| 2021/0294309 | A1* | 9/2021 | Takezawa | G06Q 50/04 |
| 2022/0012665 | A1 | 1/2022 | Suginishi et al. | |

FOREIGN PATENT DOCUMENTS

| | | | | |
|---|---|---|---|---|
| CN | 112862437 | A | 5/2021 | |
| CN | 113110366 | A | 7/2021 | |
| CN | 113496341 | A | 10/2021 | |
| CN | 113902268 | A | 1/2022 | |
| CN | 114449023 | A | 5/2022 | |
| CN | 114488988 | A | 5/2022 | |
| CN | 114629940 | A | 6/2022 | |
| CN | 114637270 | A | 6/2022 | |
| DE | 10109758 | A1 | 9/2002 | |
| JP | 2004078279 | A | 3/2004 | |
| JP | 2007109095 | A | 4/2007 | |
| JP | 2007172286 | A | 7/2007 | |
| JP | 2008047835 | A | 2/2008 | |
| JP | 2021026712 | A | 2/2021 | |
| WO | WO-2017013108 | A1 * | 1/2017 | ........... G06Q 10/063 |

OTHER PUBLICATIONS

Cha, Suk-Keun, Jeong-Hoon Lee, Joon-Yub Song, Dong-Hoon Kim, and Gyu-Bong Lee. "An auto-configuration of 4M group management using Wireless Sensor Networks for reconfigurable manufacturing system." In 2009 IEEE International Symposium on Assembly and Manufacturing, pp. 208-213. IEEE, 2009. (Year: 2009).*

B. Chen, J. Wan, L. Shu, P. Li, M. Mukherjee and B. Yin, "Smart Factory of Industry 4.0: Key Technologies, Application Case, and Challenges," in IEEE Access, vol. 6, pp. 6505-6519, 2018 (Year: 2018).*

Mabkhot, Mohammed M., et al. "An ontology-based multi-criteria decision support system to reconfigure manufacturing systems." IISE Transactions 52.1 (2020): 18-42. (Year: 2020).*

First Office Action in Chinese Application No. 202210738567.3 dated Aug. 8, 2022, 13 pages.

* cited by examiner

700

```
The user platform generating the production line adaptation instruction
according to the production line adaptation information of the production
line required for the production item input by the user and sending the
production line adaptation instruction to the service platform
                              │
                              ▼
The service platform receiving the production line adaptation instruction
sent by the user platform, storing and processing the production line
adaptation instruction, and sending the production line adaptation
instruction to the management platform
                              │
                              ▼
The management platform receiving and storing the production line
adaptation instruction, disassembling the production line adaptation
instruction into a plurality of production process adaptation instructions,
then, according to the production process adaptation instructions,
matching the production line required the production item input by the
user with production process of idle production line in the production line
stored in the management platform, if a consistent idle production line is
matched, the management platform sending the production process
adaptation instructions to the sensor network platform corresponding to
the idle production line, if the consistent idle production line is not
matched, the management platform generating matching failure
information and feeding the matching failure information back to the user
platform through the service platform
                              │
                              ▼
The sensor network platform receiving and processing the production
process adaptation instructions, and sending the processed production
process adaptation instructions to the object platform corresponding to
the consistent idle production line that is matched in a one-to-one
correspondence
                              │
                              ▼
The object platform receiving the production process adaptation
instructions to complete the configuration
```

PRODUCTION LINE ADAPTATION METHODS BASED ON INDUSTRIAL INTERNET OF THINGS, SYSTEMS AND STORAGE MEDIUMS THEREOF

CROSS-REFERENCE TO RELATED APPLICATIONS

This application claims priority of Chinese Patent Application No. 202210738567.3, filed on Jun. 28, 2022, the contents of which are hereby incorporated by reference to its entirety.

TECHNICAL FIELD

This present disclosure relates to the technical field of intelligent manufacturing, and in particular to a production line adaptation method based on Industrial Internet of Things, system and storage medium.

BACKGROUND

Intelligent manufacturing is the unity of machine intelligence and human, in which intelligent production line device is the realization end of intelligent manufacturing, and industrial automation is an important foundation of intelligent production line device. At present, industrial automation covers almost all manufacturing fields including automobiles, defense industry, chemical industry, light industry, etc., which plays a crucial role in the development of intelligent manufacturing. Industrial automation integrated with Industrial Internet of Things technology is gradually popularized and applied in the field of intelligent manufacturing and is favored. The industrial Internet of Things systems currently used in the field of intelligent manufacturing are generally developed for a single production item, and are compatible with a certain type of control system or a unique control system used by a user. After the production item is replaced, an independent Internet of Things system needs to be developed, which has low compatibility and high system development cost, which seriously affects the promotion and application of industrial Internet of Things technology in the field of intelligent manufacturing. Therefore, it is necessary to provide a production line adaptation method based on Industrial Internet of Things, system and medium.

SUMMARY

This present disclosure provides a production line adaptation system based on Industrial Internet of Things. The system comprises: an instruction generation module configured to generate an adaptation instruction based on production item data of a production line required by a production item input by a user; a production adaptation module configured to generate a target adaptation scheme based on the received adaptation instruction, the target adaptation scheme including a plurality of target adaptation parameters, the target adaptation parameters reflecting a matching relationship between a production process in the production line required by the production item and a corresponding production process in a plurality of target production lines, the plurality of target production lines being production lines that need to be adapted to obtain the production line required by the production item; obtain adaptation results by adapting the plurality of target production lines based on the target adaptation scheme; and a feedback module configured used to determine feedback results according to the adaptation results; and a process configuration module configured to perform process configuration on the plurality of target production lines to obtain the production line required by the production item in response to the feedback results indicating that the adaptation is successful.

This present disclosure provides a production line adaptation method based on the Industrial Internet of Things. The method comprises: generating an adaptation instruction based on production item data of a production line required by a production item input by a user; generating a target adaptation scheme based on the adaptation instruction, the target adaptation scheme including a plurality of target adaptation parameters, the target adaptation parameters reflecting a matching relationship between a production process in the production line required by the production item and a corresponding production process in the plurality of target production lines, and the plurality of target production lines being production lines that need to be adapted to obtain the production lines required by the production item; obtaining an adaptation result by adapting the plurality of target production lines based on the target adaptation scheme; determining a feedback result according to the adaptation result; performing process configuration on the plurality of target production lines to obtain production line required by the production item in response to the feedback results indicating that the adaptation is successful.

This present disclosure provides a non-transitory computer-readable storage medium, comprising a set of instructions, when executed by a processor, a production line adaptation method based on the Industrial Internet of Things as described above is implemented.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 7 is another exemplary flowchart of an application of production line adaptation system based on the Industrial Internet of Things according to some embodiments of the present disclosure.

DETAILED DESCRIPTION

Figure 1:
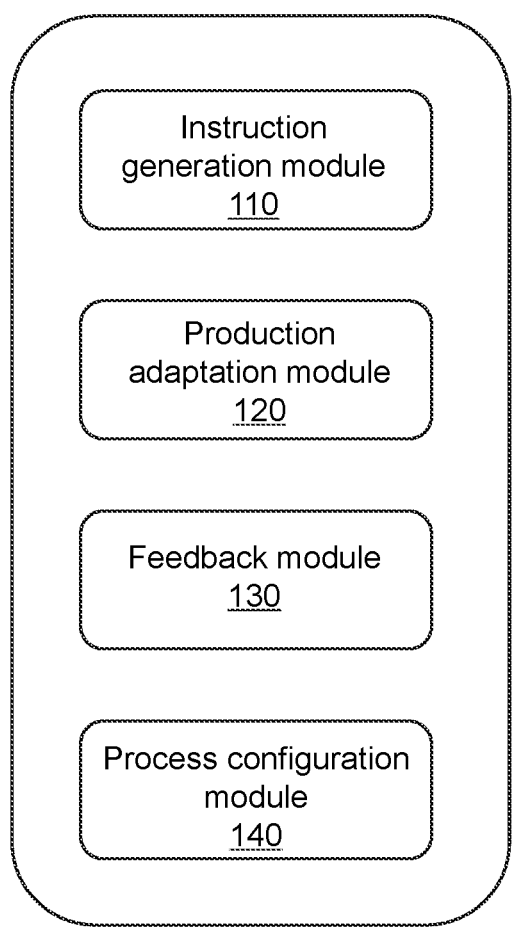
FIG. 1 is an exemplary block diagram of a production line adaptation system based on the Industrial Internet of Things according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations is not necessarily performed in order to accurately. Instead, the operations may be processed in reverse order or simultaneously. Moreover, one or more other operations may be added to the flowcharts. One or more operations may be removed from the flowcharts.

FIG. 1 is an exemplary block diagram of a production line adaptation system based on the Industrial Internet of Things according to some embodiments of the present disclosure.

As shown in FIG. 1, the production line adaptation system 100 based on the Industrial Internet of Things may include an instruction generation module 110, a production adaptation module 120, a feedback module 130 and a process configuration module 140.

The instruction generation module 110 may be configured to generate an adaptation instruction based on production item data of a production line required for a production item input by a user. For more information about generating the adaptation instruction, please refer to FIG. 2 and its related descriptions.

The production adaptation module 120 may be configured to generate a target adaptation scheme based on the received adaptation instruction. The target adaptation scheme includes a plurality of target adaptation parameters, the target adaptation parameters reflect a matching relationship between a production process in the production line required by the production item and a corresponding production process in a plurality of target production lines, and the plurality of target production lines are production lines that need to be adapted to obtain the production line required by the production item. For more information about generating the target adaptation scheme, please refer to FIG. 2 and its related descriptions. In some embodiments, the production adaptation module 120 may also be configured to adapt the plurality of target production lines based on the target adaptation scheme to obtain adaptation results. For more information about obtaining the adaptation results, please refer to FIG. 2 and its related descriptions.

In some embodiments, the production adaptation module 120 is further configured to encode each of the plurality of target production lines to obtain a production line code corresponding to each target production line; encode each production process in each target production line to obtain a process code corresponding to each production process; construct a plurality of initial adaptation schemes based on the production line code and process code of each of the plurality of target production lines and the received adaptation instruction; perform multiple rounds of iterative updates on the plurality of initial adaptation schemes to determine the target adaptation scheme based on the preset algorithm. For more information about determining the target adaptation scheme, please refer to FIG. 3 and its related descriptions.

In some embodiments, the production adaptation module 120 is further configured to obtain historical monitoring data of each production process on each target production line; determine evaluation parameters for each of the plurality of initial adaptation schemes based on the historical monitoring data; determine a plurality of first candidate adaptation schemes from the plurality of initial adaptation schemes based on the evaluation parameters; perform a first transformation and/or a second transformation on the plurality of first candidate adaptation schemes to determine a plurality of second candidate adaptation schemes; take the plurality of first candidate adaptation schemes and the plurality of second candidate adaptation schemes as initial adaptation schemes for a next round, continue the iterative update until preset conditions are met to determine the target adaptation scheme. For more information about determining the target adaptation scheme, please refer to FIG. 4 and its related descriptions.

In some embodiments, the production adaptation module 120 is further configured to, for each of the plurality of initial adaptation schemes, determine initial production cost and initial transfer cost of each of the production processes in the initial adaptation schemes under the corresponding candidate adaptation parameters based on the historical monitoring data; determine a total production cost of the initial adaptation schemes based on the initial production cost and initial transfer cost; determine the evaluation parameters of the initial adaptation schemes based on the total production cost. For more information about determining the evaluation parameters of the initial adaptation schemes, please refer to FIG. 5 and its related descriptions.

In some embodiments, the production adaptation module 120 is further configured to obtain preset production standard of the production line required by the production item input by the user; determine the evaluation parameters based on the preset production standard and the total production cost. For more information about determining the evaluation parameters, please refer to FIG. 4 and its related description.

In some embodiments, the production adaptation module 120 is further configured to, for each of the plurality of initial adaptation schemes, determine initial selection parameters of the initial adaptation schemes based on the evaluation parameters corresponding to the initial adaptation schemes, and the initial selection parameters are used to represent an initial probability that the initial adaptation schemes are determined as the first candidate adaptation schemes; adjust the initial selection parameters based on the initial production cost to determine selection parameters, and the selection parameters are used to characterize a probability that the initial adaptation schemes are determined as the first candidate adaptation schemes; and determine the plurality of first candidate adaptation schemes from the plurality of initial adaptation schemes based on each corresponding selection parameters of the plurality of initial adaptation schemes. For more information about determining the plurality of first candidate adaptation schemes, please refer to FIG. 4 and its related descriptions.

In some embodiments, the production adaptation module 120 is further configured to exchange candidate adaptation parameters corresponding to the same production process in the plurality of first candidate adaptation schemes to generate a plurality of second candidate adaptation schemes. For more information about generating a plurality of second candidate adaptation schemes, please refer to FIG. 4 and its related descriptions.

In some embodiments, the production adaptation module 120 is further configured to, for each of the plurality of first candidate adaptation schemes, adjust the candidate adaptation parameters in the first candidate adaptation schemes to generate the plurality of second candidate adaptation schemes. For more information about producing at least one second candidate adaptation scheme, please refer to FIG. 4 and its related descriptions.

The feedback module 130 may be configured to determine feedback results according to the received adaptation results. For more information about determining the feedback results, please refer to FIG. 2 and its related descriptions.

The process configuration module 140 may be configured to, in response to the feedback results indicating that the adaptation is successful, perform process configuration on the plurality of target production lines to obtain the production line required by the production item. For more information about the process configuration of the plurality of target production lines, please refer to FIG. 2 and its related description.

In some embodiments, the instruction generation module, the production adaptation module, the feedback module, and the process configuration module disclosed in FIG. 1 may be different modules in a system, or may be one module to implement the functions of two or more modules mentioned above. For example, each module may share one storage module, and each module may also have its own storage module. Such deformations are all within the protection scope of this present disclosure.

Figure 2:
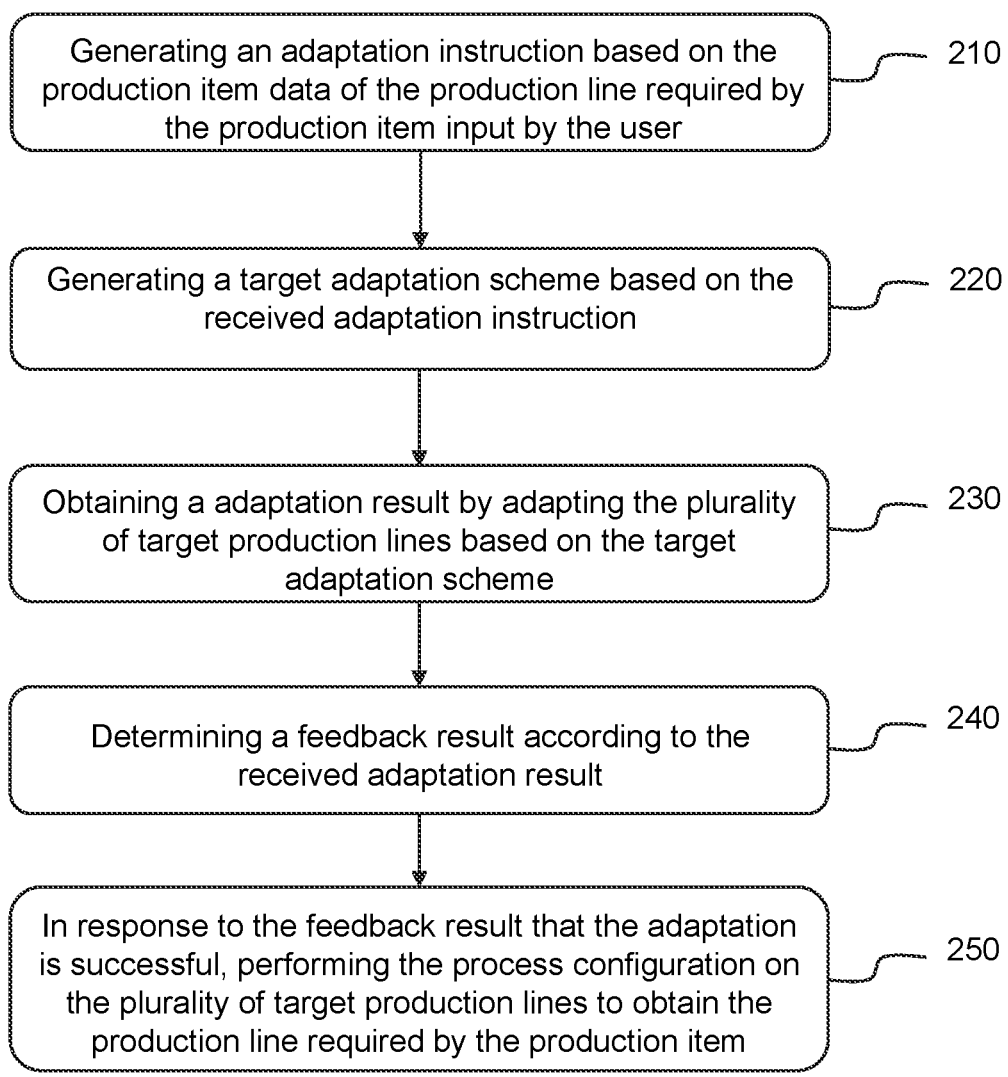
FIG. 2 is an exemplary flowchart of a production line adaptation method based on the Industrial Internet of Things according to some embodiments of the present disclosure.

FIG. 2 is an exemplary flowchart of a production line adaptation method based on the Industrial Internet of Things according to some embodiments of the present disclosure. In some embodiments, process 200 may be performed by the production line adaptation system based on the industrial Internet of Things. As shown in FIG. 2, the process 200 may include the following steps.

Step 210, generating an adaptation instruction based on the production item data of the production line required by the production item input by the user. In some embodiments, step 210 may be performed by the instruction generation module.

The user may refer to a person or group, or the like who needs to use the production line for product production. For example, the user may include, but are not limited to, production personnel, production departments, companies, or factories, or the like.

The production item may refer to an upcoming production item by the user. The production line required by the production item may be a production line to be used to the production of a certain product. For example, the production line required by the production item may be industrial product production lines, including but not limited to cream production lines, lotion production lines, hair dye production lines, perfume production lines, and powder cake production lines. Each production line (e.g., production line required by a production item, target production line, etc.) may contain multiple production processes. The production process may be the basic unit of the production process of the production line. For example, the production process of a cream production line may include: raw material processing, mixing of different raw materials, sterilization, filling, and packaging, etc.

The production item data may be data related to production line required by the production item. For example, the production item data may include, but is not limited to, the production item type of the production line required by the production item, the production process type, the sequence of each production process, the production capacity, the production quality of each production process, or the like.

In some embodiments, the instruction generation module may convert the production item data input by the user into computer operation code to generate the adaptation instruction. The adaptation instruction may be the operation code for generating the production line required for the production item. The adaptation instruction may be an operation code that includes production item data.

Step 220, generating a target adaptation scheme based on the received adaptation instruction. In some embodiments, step 220 may be performed by the production adaptation module.

The target adaptation scheme may refer to the adjustment and combination of the plurality of target production lines to generate the production line required by the production item. The plurality of target production lines are production lines that need to be adapted to obtain the production line required by the production item. The aforementioned target production line may be an idle production line.

In some embodiments, the target adaptation scheme may include a plurality of target adaptation parameters. The target adaptation parameters may reflect the matching relationship between the production process in the production line required by the production item and the corresponding production process in the plurality of target production lines. In some embodiments, the target adaptation scheme may be determined by adjusting a certain production process in a certain target production line based on the corresponding production process in the production line required by the production item. For example, the target adaptation parameters may be adjusting the power of the production process 1 of the target production line 2, and the adjusted production process 1 of the target production line 2 is determined as the production process 1 in the production line required by the production item.

In some embodiments, the production adaptation module may model or employ various data analysis algorithms. For example, regression analysis, discriminant analysis, etc., are used to analyze and process the adaptation instruction to generate a target adaptation plan.

In some embodiments, the plurality of target production lines may be multiple industrial product production lines, and each industrial product production line may include multiple corresponding production processes. For example, the plurality of target production lines may be multiple cosmetic production lines. For each of the multiple cosmetic production lines, the production processes in the cosmetic production line include at least a raw material pretreatment process, a reaction process between raw materials, a sterilization process, a filling process, and a packaging process. In some embodiments, the production adaptation module may encode each of the plurality of target production lines to obtain the production line code corresponding to each target production line; encode each production process in each target production line to obtain the process code corresponding to each production process; construct the plurality of initial adaptation schemes based on the production line code and process code and the received adaptation instruction; perform multiple rounds of iterative updates on the plurality of initial adaptation schemes to determine the target adaptation scheme based on the preset algorithm. For more information about determining the target adaptation scheme of the target adaptation schemes for the multiple industrial product lines, please refer to FIG. 3 and its related descriptions.

Step 230, obtain an adaptation result by adapting the plurality of target production lines based on the target adaptation scheme. In some embodiments, step 230 may be performed by the production adaptation module.

The adaptation results may be the results of adapting among the plurality of target production lines. For example, the adaptation results may be production process 1 of target production line 1+production process 2 of target production line 2+production process 3 of target production line 2+production process 4 of target production line 3.

In some embodiments, the production adaptation module may adjust the production processes corresponding to the plurality of target production lines according to the target adaptation parameters in the target adaptation scheme, and combine the production processes to obtain the adaptation results.

Step 240, determining a feedback result according to the received adaptation result. In some embodiments, step 240 may be performed by the feedback module.

The feedback results may be results reflecting whether the adaptation is successful. For example, the feedback results may be that the adaptation is successful.

In some embodiments, the feedback module may analyze based on the adaptation results, and when the analysis results meet the requirements of the production item (also referred to as the production item requirements), the feedback results may be that the adaptation is successful; when the analysis results cannot meet the requirements of the production item, the feedback results may be that the adaptation fails. The production item requirements may be determined based on the production item data. When the feedback results are that the adaptation fails, the target adaptation scheme may be continuously adjusted, and step 230 is repeatedly performed to determine the adaptation results corresponding to the adjusted target adaptation scheme and step 240 is repeated until the feedback results are that the adaptation is successful.

Step 250, in response to the feedback result that the adaptation is successful, performing the process configuration on the plurality of target production lines to obtain the production line required by the production item.

In some embodiments, when the feedback results are that the adaptation is successful, the process configuration module may perform the process configuration for each production process of the plurality of target production lines according to the target adaptation scheme to obtain production line required by the production item. The production line required by the aforementioned production item may meet the needs of the production item. For more information about the process configuration, please refer to FIG. 7 and its related descriptions.

Some embodiments of the present disclosure may adapt an idle production line based on production item data to generate the production line required by the production item.

Through the above embodiments, the utilization rate of each production line can be improved, and the production cost can be reduced.

Figure 3:
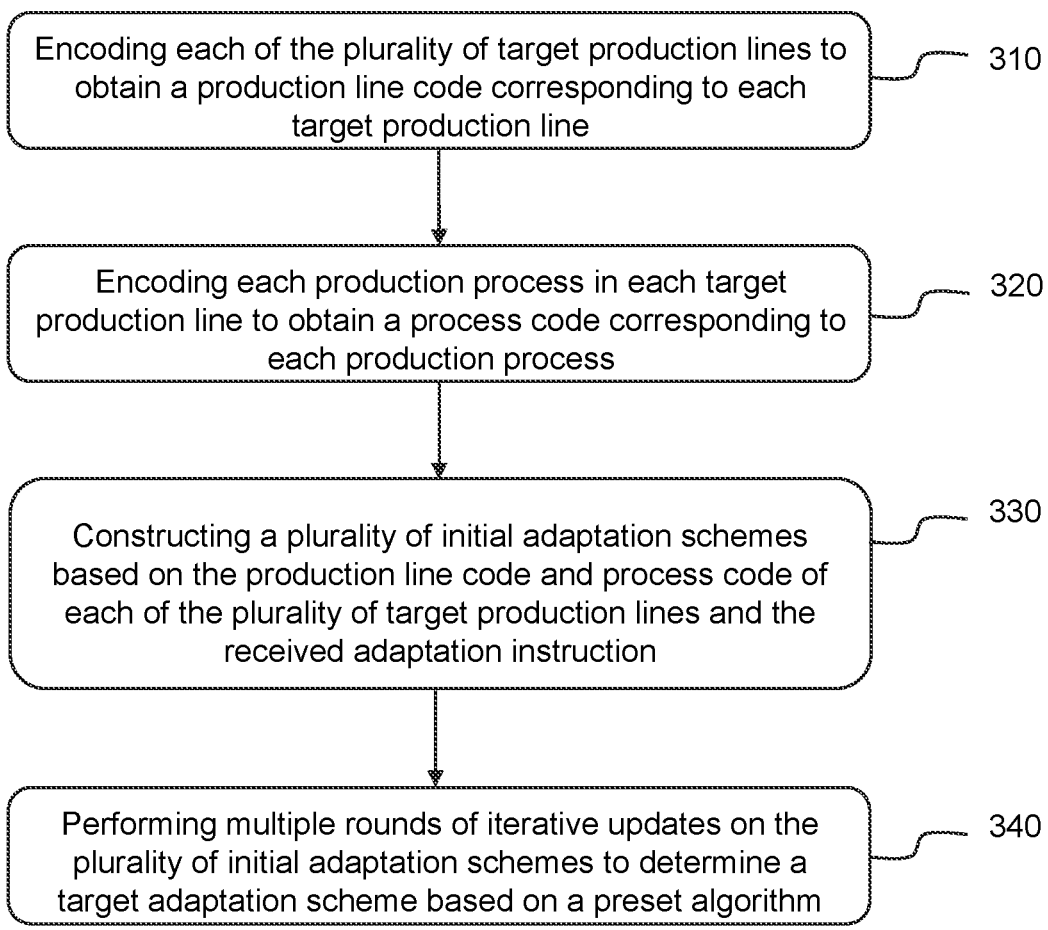
FIG. 3 is an exemplary flowchart of determining a target adaptation scheme according to some embodiments of the present disclosure.

FIG. 3 is an exemplary flowchart of determining a target adaptation scheme according to some embodiments of the present disclosure. In some embodiments, the process 300 may be performed by the production adaptation module. As shown in FIG. 3, the process 300 may include the following steps.

Step 310, encoding each of the plurality of target production lines to obtain a production line code corresponding to each target production line.

The production line code may refer to the code of the target production line. By assigning different numbers to the target production lines, different codes corresponding to different target production lines may be determined so as to be distinguished and identified.

In some embodiments, the target production line may be encoded in a number of ways to obtain the production line code. For example, manual encoding may be used to assign numbers A, B, and C to 3 different target production lines. As another example, the target production line may also be encoded automatically by the management platform.

Step 320, encoding each production process in each target production line to obtain a process code corresponding to each production process.

In some embodiments, the production process may also be encoded in various ways to obtain the process code. For example, for an industrial product production line A, the production processes may include the raw material pretreatment process, the reaction process between raw materials, the sterilization process, the filling process, and the packaging process in sequence. If the number of the sterilization process is e, the process code of the determined sterilization process may be Ae3, indicating that the sterilization process is the third production process of the production line A.

Step 330, constructing a plurality of initial adaptation schemes based on the production line code and process code of each of the plurality of target production lines and the received adaptation instruction.

The initial adaptation schemes may preliminarily determine the adaptation schemes for a plurality of target production lines. The initial adaptation schemes may contain multiple candidate adaptation parameters. The candidate adaptation parameters may be candidate parameters that reflect the matching relationship between the production process in the production line required by the production item and the corresponding production process in the plurality of target production lines. In some embodiments, the candidate adaptation parameters may also include candidate adjustment parameters. For example, Aa1(+10) may indicate that the first production process in the production line required by the production item is executed by the first production process of the target production line A, this process is a raw material pretreatment process, and the corresponding power of the pretreatment device needs to be increased by 10%.

In some embodiments, the initial adaptation schemes may be represented by a vector. The position of the element in the vector may represent the sequence of the production process in the production line required by the production item, and the value of the element represents how to generate the corresponding production process in the production line required by the production item. For example, a certain initial adaptation scheme may be (Aa1, Hb4, Xc4, Sd7), and the candidate adaptation parameters in the initial adaptation scheme may be Aa1, Hb4, Xc4, and Sd7, respectively.

In some embodiments, the production adaptation module may determine a plurality of initial adaptation schemes based on the adaptation instruction, the production line codes and process codes of the plurality of target production lines. The number of process codes in each initial adaptation scheme corresponds to the number of processes in the production item input by the user, and each process code corresponds to a production process. Each of the plurality of initial adaptation schemes includes candidate adaptation parameters for adapting the production processes of the plurality of target production lines.

In some embodiments, the type of production process in the production line required by the production item and the sequence of the production process may be determined according to the adaptation instruction. Corresponding production processes in the plurality of target production lines are randomly selected and the corresponding production line codes and process codes are sorted according to the order of the aforementioned production processes to generate the plurality of initial adaptation schemes. For example, the type and sequence of the production process of the production line required by the production item may be determined as (a, b, c, d) according to the adaptation instruction. Corresponding production processes in the plurality of target production lines are randomly selected and the corresponding production line codes and process codes are sorted according to the order of the aforementioned production processes to generate a plurality of initial adaptation schemes such as (Aa1, Ab2, Bc2, Bd3), (Ba1, Ab2, Bc2, Bd3), (Aa1, Ab2, Ac2, Bd3), or the like.

Step 340, performing multiple rounds of iterative updates on the plurality of initial adaptation schemes to determine a target adaptation scheme based on a preset algorithm.

In some embodiments, the production adaptation module may iteratively update the plurality of initial adaptation schemes based on the preset algorithm to determine the target adaptation scheme. The preset algorithm may refer to an algorithm set in advance for updating a plurality of initial adaptation schemes. The preset algorithm may be a variety of feasible algorithms. For example, the preset algorithm may be a particle swarm algorithm, a reinforcement learning algorithm, or the like. In some embodiments, the production adaptation module may acquire historical monitoring data of each production process on each target production line; determine evaluation parameters for each of the plurality of initial adaptation schemes based on the historical monitoring data; determine a plurality of first candidate adaptation schemes from the plurality of initial adaptation schemes based on the evaluation parameters; perform a first transformation and/or a second transformation on the plurality of first candidate adaptation schemes to determine a plurality of second candidate adaptation schemes; take the plurality of first candidate adaptation schemes and the plurality of second candidate adaptation schemes in this round of iterations as the initial adaptation schemes for the next round, and continue the iterative update until the preset conditions are met, and determine the target adaptation scheme. For more information about the above-mentioned embodiments, please refer to FIG. 4 and its related descriptions.

In some embodiments of the present disclosure, the initial adaptation schemes are determined by encoding the target production line and production process. Then, the preset algorithm is used to process the initial adaptation schemes, and a reasonable target adaptation scheme may be efficiently determined on the basis of meeting user needs.

Figure 4:
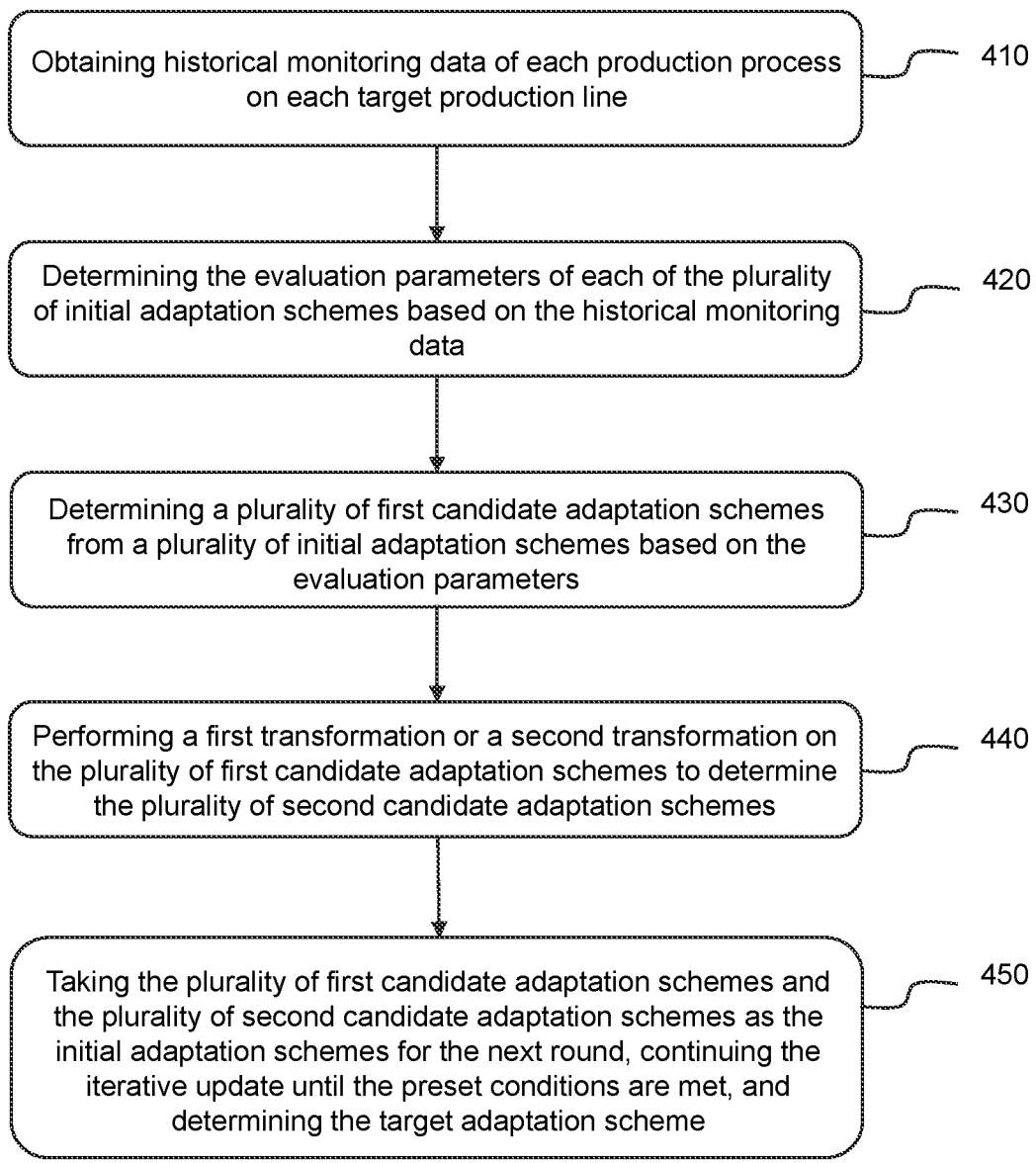
FIG. 4 is another exemplary flowchart of determining a target adaptation scheme according to some embodiments of the present disclosure.

FIG. 4 is another exemplary flowchart of determining a target adaptation scheme according to some embodiments of the present disclosure. In some embodiments, process 400 may be performed by the production adaptation module. As shown in FIG. 4, the process 400 may include the following steps.

Step 410, obtaining historical monitoring data of each production process on each target production line.

The historical monitoring data may refer to various monitoring data of the target production line in the historical production process. The historical monitoring data may include but not limited to raw material data, energy consumption data, processing data, and labor workload data of the target production line. In some embodiments, relevant costs, such as raw material cost, energy consumption cost, processing cost, labor cost, etc., may be determined based on the historical monitoring data. In some embodiments, the object platform may obtain and store the historical monitoring data of the target production line. The production adaptation module may obtain the historical monitoring data of the target production line in the object platform based on the sensor network.

Step 420, determining the evaluation parameters of each of the plurality of initial adaptation schemes based on the historical monitoring data.

The evaluation parameters may refer to relevant parameters used to evaluate the rationality of the initial adaptation scheme. The evaluation parameters may be positively correlated with the rationality of the initial adaptation scheme. That is, the more reasonable the initial adaptation scheme is, the larger the value of its evaluation parameters is. In some embodiments, the production adaptation module may perform modeling or employ various data analysis algorithms, such as regression analysis, discriminant analysis, etc., for each of the plurality of initial adaptation schemes. The historical data of the target production line involved in the initial adaptation scheme is analyzed and processed to obtain the evaluation parameters of the initial adaptation scheme.

In some embodiments, for each of the plurality of initial adaptation schemes, the production adaptation module may determine the initial production cost and initial transfer cost of each production process in the initial adaptation scheme based on the historical monitoring data under the corresponding candidate adaptation parameters; determine the total production cost of the initial adaptation scheme based on the initial production cost and initial transfer cost; and determine the evaluation parameters of the initial adaptation scheme based on the total production cost. For more information about the above-mentioned embodiments, please refer to FIG. 5 and its related descriptions, which will not be repeated here.

Step 430, determining a plurality of first candidate adaptation schemes from a plurality of initial adaptation schemes based on the evaluation parameters.

The first candidate adaptation schemes may refer to adaptation schemes determined from a plurality of initial adaptation schemes. In some embodiments, the plurality of first candidate adaptation schemes may be determined from the plurality of initial adaptation schemes through various methods. For example, an initial adaptation scheme whose evaluation parameters are greater than a preset evaluation parameter threshold may be determined as the first candidate adaptation scheme.

In some embodiments, for each of the plurality of initial adaptation schemes, the production adaptation module may determine the initial selection parameters of the initial adaptation scheme based on the evaluation parameters corresponding to the initial adaptation scheme, and the initial selection parameters are used to characterize the initial probability that the initial adaptation scheme is determined as the first candidate adaptation scheme. For example, the production adaptation module may determine the initial selection parameters of the initial adaptation scheme based on the ratio of the evaluation parameters corresponding to the initial adaptation scheme to the sum of the evaluation parameters of all initial adaptation schemes.

In some embodiments, the production adaptation module may determine the selection parameters by adjusting the initial selection parameters based on the initial production cost. The selection parameters are used to characterize the probability that the initial adaptation scheme is determined as the first candidate adaptation scheme. The production adaptation module may adjust the initial selection parameters based on the size of the evaluation parameters corresponding to the initial adaptation scheme, thereby determining the selection parameters. For example, for all initial adaptation schemes whose evaluation parameters are not 0, all the initial adaptation schemes may be sorted from large to small according to the size of the evaluation parameters, and then the corresponding initial selection parameters may be adjusted respectively based on preset rules. For the top ranked initial adaptation scheme, the initial selection parameter may be appropriately increased so as to determine the selection parameters.

In some embodiments, the production adaptation module may determine the plurality of first candidate adaptation schemes from the plurality of initial adaptation schemes based on the selection parameters corresponding to each of the plurality of initial adaptation schemes. For example, an initial adaptation scheme whose selection parameters are greater than a preset selection parameter threshold may be determined as the first candidate adaptation scheme.

In some embodiments of this present disclosure, by setting reasonable selection parameters and selecting an initial adaptation scheme, an initial adaptation scheme with larger evaluation parameters may be selected with a higher probability for the next operation, which can meet user needs and improve computing efficiency.

Step 440, performing a first transformation or a second transformation on the plurality of first candidate adaptation schemes to determine the plurality of second candidate adaptation schemes.

The second candidate adaptation schemes may refer to newly generated adaptation schemes after transforming the first candidate adaptation schemes. The aforementioned transformation process may include a first transformation and/or a second transformation.

The first transformation may include exchanging candidate adaptation parameters corresponding to the same production process in the plurality of first candidate adaptation schemes. In some embodiments, the production adaptation module may exchange the candidate adaptation parameters corresponding to the same production process in the plurality of first candidate adaptation schemes to generate the plurality of second candidate adaptation schemes. For example, the first candidate adaptation scheme 1 is (Aa2, Cb4, Fc2, Gd6), and the first candidate adaptation scheme 2 is (Ba3, Eb4, Tc8, Jd5), the candidate adaptation parameters corresponding to the first and fourth production processes in the first candidate adaptation scheme 1 may be respectively adjusted and the candidate adaptation parameters corresponding to the second and third production processes in the first candidate adaptation scheme 2 are exchanged to generate second candidate adaptation scheme as (Aa2, Eb4, Tc8, Gd6) and/or (Ba3, Cb4, Fc2, Jd5).

In some embodiments, in the first candidate adaptation scheme, the candidate adaptation parameters corresponding to the production process with higher initial production cost and initial transfer cost may be exchanged preferentially so as to reduce the total production cost of the first candidate adaptation scheme. Some embodiments of this present disclosure can improve the iterative update speed of the preset algorithm by changing the candidate adaptation parameters corresponding to the production process with a higher total production cost in the first candidate adaptation scheme, thereby improving the efficiency of determining the target adaptation scheme.

The second transformation may include, for each of the plurality of first candidate adaptation schemes, adjusting candidate adaptation parameters in the first candidate adaptation scheme. In some embodiments, for each of the plurality of first candidate adaptation schemes, the production adaptation module may adjust the candidate adaptation parameters in the first candidate adaptation scheme to generate a plurality of second candidate adaptation schemes. For example, if the first candidate adaptation scheme 1 is (Aa2, Cb4, Fc2, Gd6), the candidate adaptation parameters corresponding to the third process in the first candidate adaptation scheme 1 are adjusted. That is, to modify Fc2 to Gc4, the new second candidate adaptation scheme generated after modification is (Aa2, Cb4, Gc4, Gd6).

In some embodiments, in the first candidate adaptation scheme, the candidate adaptation parameters corresponding to the production process with higher initial production cost and initial transfer cost may be adjusted preferentially so as to reduce the total production cost of the first candidate adaptation scheme. Some embodiments of this present disclosure may improve the efficiency of determining the target adaptation scheme by changing the candidate adaptation parameters corresponding to the production process with higher initial production cost and initial transfer cost in the first candidate adaptation scheme.

In some embodiments of the present disclosure, by performing the first transformation and/or the second transformation on the plurality of first candidate adaptation schemes, the plurality of second candidate adaptation schemes may be quickly obtained. However, by adjusting or exchanging the candidate adaptation parameters corresponding to the production process with higher initial production cost and initial transfer cost in the first candidate adaptation scheme, the operation efficiency can be improved, and the target adaptation scheme can be determined more quickly.

Step 450, taking the plurality of first candidate adaptation schemes and the plurality of second candidate adaptation schemes as the initial adaptation schemes for the next round, continuing the iterative update until the preset conditions are met, and determining the target adaptation scheme.

In some embodiments, the production adaptation module may determine the evaluation parameters of the plurality of first candidate adaptation schemes and the plurality of second candidate adaptation schemes, and sort the evaluation parameters of the plurality of first candidate adaptation schemes and the plurality of second candidate adaptation schemes in descending order, and then eliminate the first candidate adaptation scheme and/or the second candidate adaptation scheme whose ranking of evaluation parameters is lower than the preset ranking threshold; determine the remaining first candidate adaptation schemes and/or the remaining second candidate adaptation schemes as the initial adaptation schemes for the next round, and perform steps 420 to 450, continue to iteratively update until the preset conditions are met to determine the first candidate adaptation scheme or the second candidate adaptation scheme with the largest evaluation parameter as the target adaptation scheme.

In some embodiments, the preset conditions may include at least one of the number of iteration reaching a preset number threshold, the evaluation parameters reaching a preset parameter threshold, and the difference between the evaluation parameters before and after two consecutive iterations less than a preset difference threshold. The preset conditions may be preset by the user.

In some embodiments of this present disclosure, the initial adaptation scheme is iteratively updated and adjusted by using a preset algorithm until the preset conditions are met, and then the final target adaptation scheme is determined based on the size of the evaluation parameters. It has high efficiency and high accuracy, which is more in line with the actual situation and meets the needs of users. In addition, by setting reasonable preset conditions for stopping the iterative update, the target adaptation scheme can be effectively obtained so as to avoid excessive computation load and improve computation efficiency.

Figure 5:
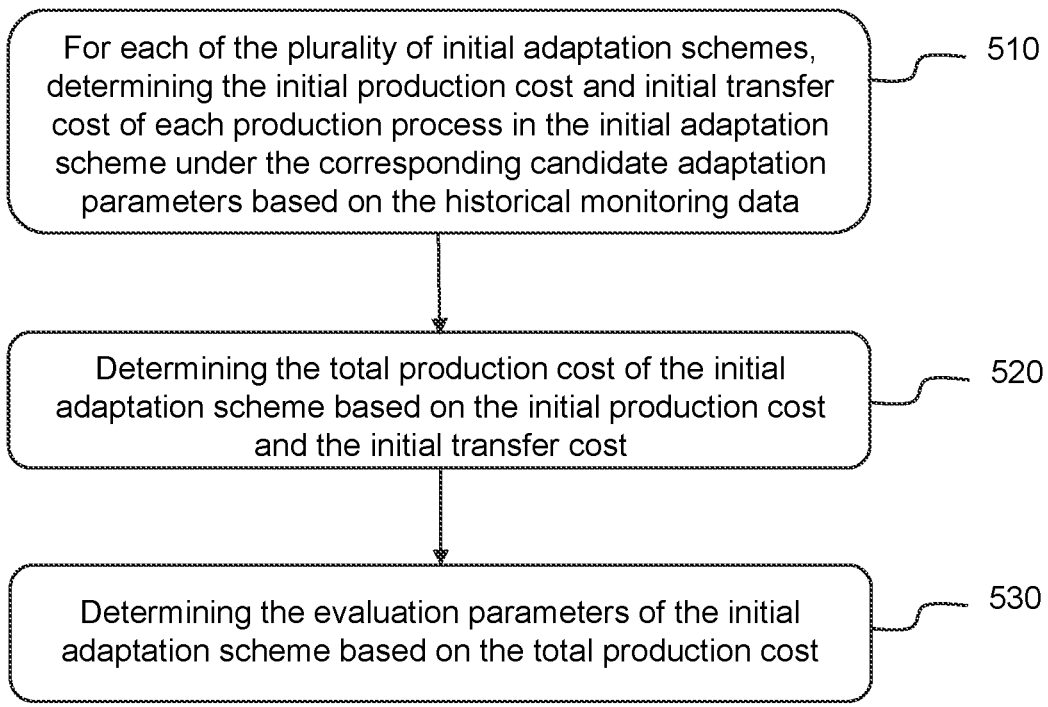
FIG. 5 is an exemplary flowchart of determining evaluation parameters of an initial adaptation scheme according to some embodiments of the present disclosure.

FIG. 5 is an exemplary flowchart of determining evaluation parameters of an initial adaptation scheme according to some embodiments of the present disclosure. In some embodiments, process 500 may be performed by the production adaptation module. As shown in FIG. 5, the process 500 includes the following steps.

Step 510, for each of the plurality of initial adaptation schemes, determining the initial production cost and initial transfer cost of each production process in the initial adaptation scheme under the corresponding candidate adaptation parameters based on the historical monitoring data.

The initial production cost may refer to the sum of the costs required to execute the production process on the target production line corresponding to the candidate adaptation parameters in the initial adaptation scheme. For example, for the initial adaptation scheme (Aa1, Cb6, Bc4, Hd3, Ce2), the production costs of the production processes corresponding to the candidate adaptation parameters Aa1, Cb6, Bc4, Hd3 and Ce2 are summed to determine the initial production cost of the initial adaptation scheme.

In some embodiments, the initial production cost may be determined based on the historical monitoring data. For example, the historical average production costs of the processes corresponding to the candidate adaptation parameters in the initial adaptation scheme may be summed up as the initial production cost based on the historical monitoring data.

The initial transfer cost may refer to the sum of transfer cost incurred when transferring between two production processes based on candidate adaptation parameters in the initial adaptation scheme. For example, the initial transfer cost may include the cost incurred when transferring raw materials, semi-finished products, and consumables from production process a on one target production line to production process b on another target production line. The production process b may be the next step of the production process a. For example, for the initial adaptation scheme (Aa3, Cb6, Bc4, Hd3, Ce2), the initial transfer cost may include the sum of the transfer cost incurred in transferring from the production process corresponding to Aa3 to the production process corresponding to Cb6, the transfer cost incurred from the production process corresponding to Cb6 to the production process corresponding to Bc4, the transfer cost incurred from the production process corresponding to Bc4 to the production process corresponding to Hd3, and the transfer cost incurred from transferring the production process corresponding to Hd3 to the production process corresponding to Ce2.

In some embodiments, the initial transfer cost may be determined based on the historical monitoring data. For example, the historical average transfer cost between the corresponding processes of the candidate adaptation parameters in the initial adaptation scheme may be summed up as the initial transfer cost based on the historical monitoring data.

It can be understood that, when transferring semi-finished products in production from one production process to the next production process, the transfer cost is also different due to differences in production lines, transfer distances and transfer efficiencies.

Step 520, determining the total production cost of the initial adaptation scheme based on the initial production cost and the initial transfer cost.

In some embodiments, the production adaptation module may process the initial production cost and the initial transfer cost by using various methods such as statistical analysis and/or mathematical calculation to determine the total production cost. For example, the initial production cost and the initial transfer cost may be summed to determine the total production cost of the initial adaptation scheme.

Step 530, determining the evaluation parameters of the initial adaptation scheme based on the total production cost.

In some embodiments, the production adaptation module may process the total production cost of the initial adaptation scheme in various ways to determine the evaluation parameters of the initial adaptation scheme. In some embodiments, the production adaptation module may process the total production cost of the initial adaptation scheme by establishing a mathematical function to determine the evaluation parameters of the initial adaptation scheme. For example, the evaluation parameters may be determined based on the following formula:

$$F=1/x$$

where F denotes the evaluation parameters, and x denotes the total production cost corresponding to the initial adaptation scheme.

In some embodiments, the production adaptation module may also obtain preset production standard of the production line required by the production item.

The preset production standard may refer to the production standard preset by the production line required by the production item. For example, the preset production standard may include the production capacity, production efficiency, and production quality corresponding to each production process in the production line required by the production item. The preset production standard may be determined based on the production item data.

In some embodiments, the production adaptation module may further determine the evaluation parameters of the initial adaptation scheme based on the preset production standard and the total production cost. The production adaptation module may determine the production line corresponding to the initial adaptation scheme based on the initial adaptation scheme, perform simulated operation production on the production line corresponding to the initial adaptation scheme, and determine the production data of the production line corresponding to the initial adaptation scheme. The production adaptation module may judge whether the production data conforms to the preset production standard. When the production data does not meet the preset production standard, the evaluation parameters corresponding to the initial adaptation scheme may be determined to be 0. When the production data meets the preset production standard, the evaluation parameters of the initial adaptation scheme may be determined based on the total production cost.

It can be understood that when the production line corresponding to the initial adaptation scheme cannot meet the preset production standard, even if the total production cost corresponding to the initial adaptation scheme is very low, it cannot meet the needs of the production item. Therefore, the initial adaptation scheme is unreasonable, and the corresponding evaluation parameter should be 0. For example, the production quality required by the production item input by the user is grade A, while the production data of the production line corresponding to an initial adaptation scheme may only reach grade C, then the initial adaptation scheme is unreasonable, and the corresponding evaluation parameter is 0.

Various production costs corresponding to the required production adaptation scheme may be quickly and accurately obtained for further processing based on the historical monitoring data.

In some embodiments of the present disclosure, the evaluation parameter is determined based on whether a certain production process in the initial adaptation scheme may meet the user requirements and its cost. Then, the rationality of the initial adaptation scheme may be reasonably evaluated so as to compare and select the target adaptation scheme.

In different parts of this present disclosure, the adaptation instruction may also be referred to as a production line adaptation instruction, and the target production line may also be referred to as an idle production line.

Figure 6:
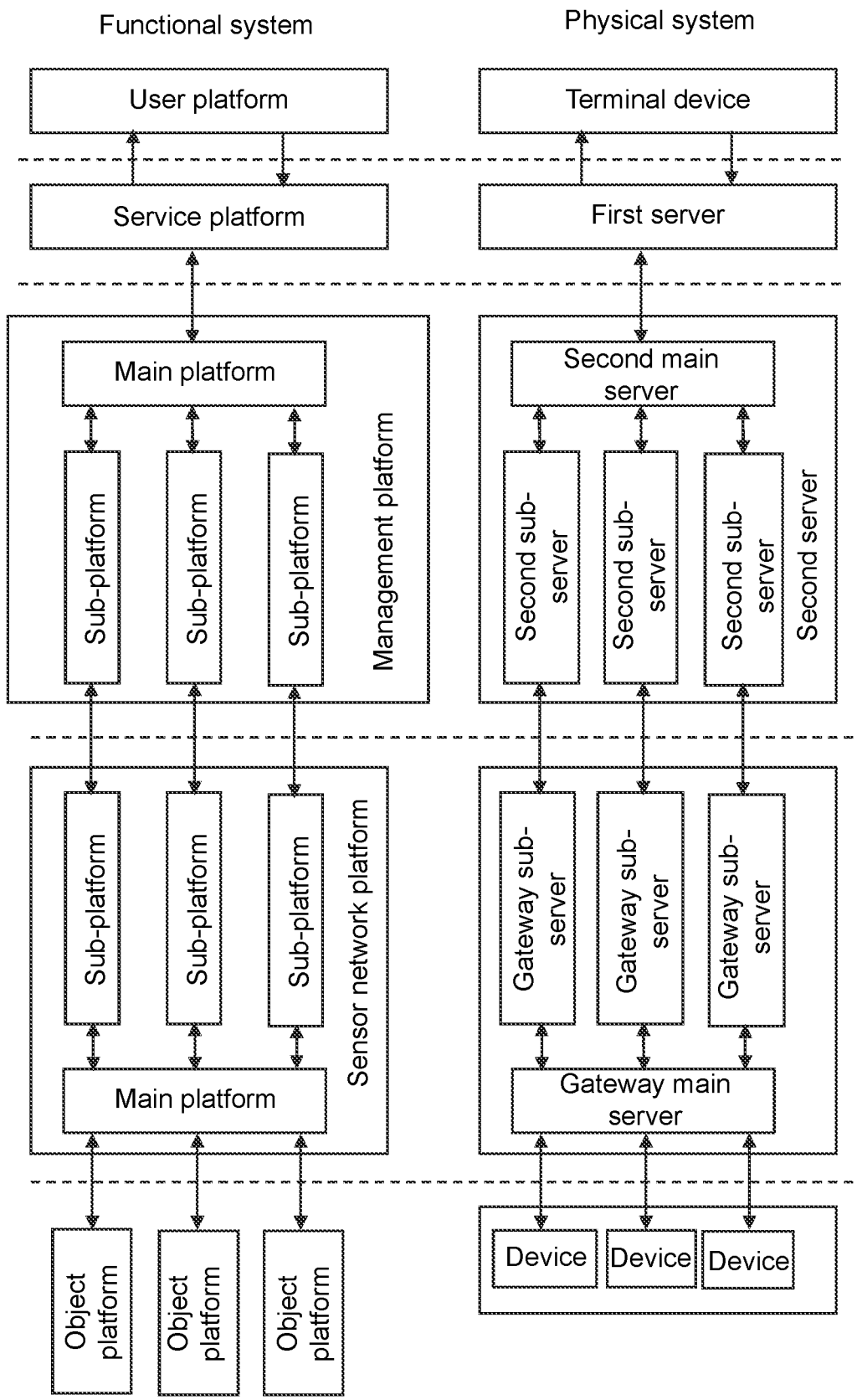
FIG. 6 is a system architecture diagram of a production line adaptation system based on the Industrial Internet of Things according to some embodiments of the present disclosure.

FIG. 6 is a system architecture diagram of a production line adaptation system based on the Industrial Internet of Things according to some embodiments of the present disclosure.

Embodiment 1

As shown in FIG. 6, the production line adaptation system based on the Industrial Internet of Things includes: a user platform, a service platform, a management platform, a sensor network platform, and an object platform that interact in sequence. The instruction generation module may be executed by the user platform, the production adaptation module may be executed by the service platform and the management platform, the feedback module may be executed by the sensor network platform, the process configuration module may be performed by the object platform. The user platform, which is configured as a terminal device that interacts with the user, receives information input by the user, processes the information and sends the information to the service platform, and displays the information sent by the service platform to the user. The service platform, which is configured as a first server, receives the information sent by the user platform, stores and processes the information, sends the information to the management platform, obtains the information required by the user from the management platform, stores and processes the information, and sends the information to the user platform. The management platform, which is configured as a second server, receives and stores the information sent by the service platform, controls the object platform to perform parameter configuration, generates an instruction to control the operation of the object platform, and receives and stores perception information sent by the object platform. The sensor network platform is configured as a communication network and a gateway for the management platform to interact with the object platform. The object platform, which is configured as a production line device to perform manufacturing and a production line sensor to perform data acquisition, receives parameter configuration information sent by the management platform to implement configuration, receives an instruction operation of the management platform, and sends the perception information to the management platform through the sensor network platform.

In the specific implementation of this embodiment, the user platform adopts an intelligent electronic device such as a desktop computer, a tablet computer, a notebook computer, and a mobile phone to realize data processing and data communication, which is not limited here.

The information processing process mentioned in this embodiment may be processed by the processors of the terminal device and the server. The server is equipped with a corresponding database for storing data, and the database may be specifically stored on a storage device of the server, such as a hard disk and other storage. The parameter configuration information of the object platform includes production line device running data, production line device operation data, manufacturing process data, and product data such as blank samples, semi-finished products, and finished products corresponding to each stage. The perception information obtained by the object platform includes production line device running data, production line device operation data, manufacturing process data and data collected by sensors.

In the specific implementation of this embodiment, based on the different production line device and production line sensors applied to different processes, the object platform is disassembled into multiple pieces, and each object platform is provided with corresponding production line device and production line sensors.

As shown in FIG. 7, the application of the production line adaptation system based on the Industrial Internet of Things includes the following steps: the user platform generates a production line adaptation instruction according to the production line adaptation information of the production line required by the production item input by the user and sends the production line adaptation instruction to the service platform; the service platform receives the production line adaptation instruction sent by the user platform, stores and processes the production line adaptation instruction, and sends the production line adaptation instruction to the management platform; the management platform receives and stores the production line adaptation instruction, disassembles the production line adaptation instruction into a plurality of production process adaptation instructions, then, according to the production process adaptation instructions, matches the production line required the production item input by the user with the production process of the idle production line in the production line stored in the management platform; if a consistent idle production line is matched, the management platform sends the production process adaptation instructions to the sensor network platform corresponding to the idle production line, if a consistent idle production line is not matched, the management platform generates matching failure information and feeds the matching failure information back to the user platform through the service platform; the sensor network platform receives and processes the production process adaptation instructions, and sends the processed production process adaptation instructions to the object platform corresponding to the consistent idle production line that is matched in a one-to-one correspondence; and the object platform receives the production process adaptation instructions to complete the configuration. When the instruction is transmitted, the receiving and processing of the instruction by each server is specifically that the instruction is processed into a data packet format that is easy to identify by the set next-level receiving object.

When this embodiment is applied, a consistent idle production line is matched, the rapid configuration of the production line can be realized, thereby ensuring that the new production item can be quickly implemented; when no consistent idle production line is matched, it can also give feedback in time, allowing the user to lay out the production line according to the actual situation and improve the layout efficiency of the production line.

Embodiment 2

This embodiment makes the following further limitations on the basis of Embodiment 1: the service platform of this embodiment adopts a centralized arrangement, and the centralized arrangement means that the platform uniformly receives data, uniformly processes data, and uniformly sends data. The management platform of this embodiment adopts a front sub-platform arrangement, the front sub-platform arrangement means that the management platform is provided with a main platform and a plurality of sub-platforms, control information and parameter configuration information of the object platform are transmitted from the main platform of the management platform to the sub-platforms of the management platform, and perception information is transmitted from the sub-platforms of the management platform to the main platform of the management platform. In this embodiment, the main platform of the management platform is configured as a second main server, the sub-platforms of the management platform are configured as second sub-servers, the main platform of the management platform receives and processes data based on the second main server, and the sub-platform of the management platform receives and processes data based on the second sub-server. The sensor network platform adopts a rear sub-platform arrangement, the rear sub-platform arrangement means that the sensor network platform is provided with a main platform and a plurality of sub-platforms, control information and parameter configuration information of the object platform are transmitted from the main platform of the sensor network platform to the sub-platforms of the sensor network platform, and perception information is transmitted from the sub-platforms of the sensor network platform to the main platform of the sensor network platform. In this embodiment, the main platform of the sensor network platform is configured as the main server of the gateway, the sub-platforms of the sensor network platform are configured as sub-servers of the gateway, the main platform of the sensor network platform receives and processes information based on the main server of the gateway, and the sub-platforms of the sensor network platform receive and process information based on the sub-servers of the gateway. The management platform of this embodiment disassembles the production line adaptation instruction into a plurality of production process adaptation instructions and performs production line matching in the main platform of the management platform, when a consistent idle production line is matched, the plurality of production process adaptation instructions are sent to different sub-platforms of the management platform, the sub-platforms of the management platform correspondingly send the received production process adaptation instructions to the sub-platforms of the sensor network platform, the sub-platforms of the sensor network platform independently receive and process a production process adaptation instruction, and then send the production process adaptation instruction to the main platform of the sensor network platform for storage processing, and the main platform of the sensor network platform sends each processed production process adaptation instruction to the corresponding object platform. In this embodiment, each sub-platform of the management platform that receives a production process adaptation instruction corresponds to a sub-platform of the sensor network platform, and the sensor network platform independently receives and processes a production process adaptation instruction through the sub-platform of the sensor network platform.

The management platform in this embodiment adopts a front sub-platform arrangement, and control information and parameter configuration information of the object platform are transmitted from the main platform to the sub-platforms. The disassembling of production line adaptation instruction and the sending of production process adaptation instruction are more convenient. The perception information is transmitted from the sub-platforms to the main platform, which is convenient for the management platform to independently receive the perception information and then conduct unified management and feedback to the user platform. The sensor network platform of this embodiment adopts a rear sub-platform arrangement, the sub-platforms of the sensor network platform may correspond to the sub-platforms of the management platform one by one to achieve rapid data transmission, the control information and parameter configuration information of the object platform are uniformly sent to different object platforms by the main platform, the perception information is centrally obtained by the main platform and then distributed to the sub-platforms for processing, which makes the unified management and control of the production line more convenient.

Embodiment 3

This embodiment makes the following further limitations on the basis of Embodiment 1 or Embodiment 2: when the management platform does not match the idle production line that is consistent with the production line required by the production item, the management platform also calculates a first matching ratio between the production line required for the production item and all idle production lines, screens an idle production line with the highest first matching ratio and obtain a missing production process of the idle production line, then, matches the production process adaptation instruction corresponding to the missing production process of the idle production line with the remaining idle production lines, then, screens out the information of the idle production line with the highest matching ratio and matching results of the missing production process in the remaining idle production lines to the service platform, and sends the production process adaptation instruction that is successfully matched to the object platform via the sensor network platform to complete the configuration; the service platform stores and processes the information of the idle production line with the highest matching ratio and the matching results information of the missing production process in the remaining idle production lines, and sends them to the user platform, and the user platform is used for displaying screening results and matching results to the user. The management platform calculates the first matching ratio between the production line required by the production item and the idle production line including: matching all the production process adaptation instructions of the production line required by the production item with all the production processes of the idle production line that need to calculate the first matching ratio, and obtaining the first matching ratio by dividing a number of the production process adaptation instruction that is successfully matched by a total number of the production process adaptation instructions of the production line required by the production item. During the specific implementation of this embodiment, the first matching ratio threshold may also be preset, the highest first matching ratio is compared with the first matching ratio threshold, and if the highest first matching ratio is lower than the first matching ratio threshold, an implementation suggestion that the modification is not recommended may be given.

When this embodiment is applied, when the missing production process corresponds to multiple matching results, the user may further screen according to the matching results. In this embodiment, when the idle production line consistent with the production line required by the production project is not matched, the idle production line reconstruction scheme for reference may also be provided. The user may confirm whether to reconstruct the idle production line according to the production plan. When it is confirmed that the reconstruction may be implemented, the reconstruction efficiency of the production line may be improved, so that the present embodiment can be quickly applied to the production item to be implemented.

Embodiment 4

The present embodiment makes the following further limitations on the basis of Embodiment 3: when multiple idle production lines with the highest first matching ratio are screened by the management platform, the management platform calculates a second matching ratio of the missing production process for each idle production line with the highest first matching ratio in the production processes of the remaining idle production lines, the management platform only sends the information of the idle production line with the second highest matching ratio and the matching results of the missing production process in the remaining idle production lines to the service platform. The management platform calculates the second matching ratio of the missing production process of each idle production line with the highest first matching ratio in production processes of the remaining idle production line including: matching the production process adaptation instructions of the missing production process of an idle production line with the highest first matching ratio for which the second matching ratio needs to be calculated with the production processes of the remaining idle production lines, and obtaining the second matching ratio by dividing a number of the production process adaptation instruction of the missing production processes that is successfully matched by a total number of the production process adaptation instructions of the missing production process corresponding to the idle production line with the highest first matching ratio.

When this embodiment is applied, through the calculation of the second matching ratio, it is more accurate to screen the most suitable idle production line with the highest first matching ratio from multiple idle production lines with the highest first matching ratio, which can reduce the construction cost of the production line required by the production item.

Embodiment 5

This embodiment makes the following further limitations on the basis of Embodiment 4: when the management platform calculates that there are multiple idle production lines with the highest second matching ratio, the management platform calculates the sum of distances from the idle production line where the missing process is located for each idle production line with the highest second matching ratio to the idle production line with the highest second matching ratio, the management platform only sends the information of the idle production line with the smallest sum of distances and the second highest matching ratio and the matching results of the missing production process in the remaining idle production lines to the service platform. In this way, when the present embodiment is applied, an optimized production process transfer scheme may be provided, and resource waste caused by long-distance process transfer may be further avoided.

Embodiment 6

This embodiment makes the following further limitations on the basis of Embodiment 1 to Embodiment 5: the production process adaptation instruction includes a device adaptation instruction of each production line device in the production process in the production line corresponding to the production item and a sensor adaptation instruction of each production line sensor. In this embodiment, according to the production process adaptation instruction, the production line required by the production item input by the user is matched with the production process of the idle production line in the production line stored in the management platform, specifically, matching of the production line device and matching of the production line sensor are performed. Because the cost of production line device is usually high, and the production line sensor is convenient to obtain materials and easy to deploy, therefore, during the specific implementation of this embodiment, the device matching of the production line device may be carried out, when the matching of the production line sensor is carried out, if the preset sensor matching threshold is exceeded, the matching may be regarded as successful. For the production line sensors that are not matched successfully, the subsequent layout can be carried out according to the needs of the production item.

Embodiment 7

This embodiment makes the following further limitations on the basis of Embodiment 1 to Embodiment 6: after the object platform receives the production process adaptation instruction to complete the configuration, the object platform sends the perception information to the management platform through the sensor network platform; the management platform receives and processes the perception information sent by the object platform, and verifies whether the perception information corresponding to all the production process adaptation instructions has been received that within a set time interval after sending the production process adaptation instruction, and sends the proofreading results to the service platform; the service platform receives and processes the proofreading results, and feeds the proofreading results back to the user platform; and the user platform is used for displaying the proofreading results to the user. The production process adaptation instruction in this embodiment is provided with an operation instruction for controlling the operation of the object platform, which runs after configuration of the object platform is completed, and feeds back its perception information to the user platform, which can realize quick verification after the configuration is completed. In this way, the production item may be put into production quickly, and the management and control efficiency of this embodiment may be improved.

In the description of the above embodiments, relational terms such as first, second, etc. are only used to distinguish one entity or operation from another, and do not necessarily require or imply any such actual relationship or order between these entities or operations. The terms "comprising", "comprising" or any other variation thereof herein are intended to encompass a non-exclusive inclusion, including not only those elements, it also includes other elements not expressly listed or inherent to such a process, method, article, or apparatus. Those skilled in the art can clearly understand that the technical schemes described in the embodiments disclosed herein can be implemented by means of software plus a necessary general hardware platform, and of course can also be implemented by hardware, but in many cases the former is the better implementation. Based on this understanding, the essence of the technical scheme of the present disclosure of the part contributed to the existing technology may be reflected in the form of software products. The software product uses several instructions stored in a computer readable storage medium, such as Memory (RAM), only read memory (ROM), programmable only memory (PROM), eraser, programmable only memory (EPROM), CD-ROM, soft disk, box tape, magnetic agency, optical medium, or other computer readable storage media to enable devices (such as mobile phones, computers, servers, network devices, etc.) to implement the method described in the embodiments.

The specific embodiments described above further describe the objectives, technical schemes and beneficial effects of the present disclosure in detail, and it should be understood that the above descriptions are only specific embodiments of the present disclosure, and are not intended to limit the scope of the present disclosure, any modification, equivalent replacement, improvement, etc. made within the spirit and principle of the present disclosure shall be included within the protection scope of the present disclosure.

This present disclosure provides a non-transitory computer-readable storage medium, comprising a set of instructions, when executed by a processor, a production line adaptation method based on the Industrial Internet of Things as described in the foregoing embodiments is implemented.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A production line adaptation method based on an Industrial Internet of Things, which is implemented based on a user platform, a service platform, a management platform, a sensor network platform, and an object platform interacting in sequence; comprising:

generating, by the user platform, which is configured as a terminal device that interacts with a user, a production line adaptation instruction according to production line adaptation information of a production line required for a production item input by the user and sending the production line adaptation instruction to the service platform; comprising:

converting production item data input by the user into computer operation code to generate the production line adaptation instruction by a processor of the terminal device, wherein the production line adaptation information includes the production item data;

receiving, by the service platform, which is configured as a first server, the production line adaptation instruction sent by the user platform, storing and processing the production line adaptation instruction, and sending the production line adaptation instruction to the management platform;

receiving and storing, by the management platform, which is configured as a second server, the production line adaptation instruction, disassembling the production line adaptation instruction into a plurality of production process adaptation instructions, then, according to the production process adaptation instructions, matching the production line required the production item input by the user with production process of an idle production line in the production line stored in the management platform, if a consistent idle production line is matched, sending the production process adaptation instructions to the sensor network platform corresponding to the idle production line, if the consistent idle production line is not matched, generating matching failure information and feeding the matching failure information back to the user platform through the service platform; comprising:

generating a target adaptation scheme based on the production line adaptation instruction received by a processor of the second server, comprising:

obtaining a production line code corresponding to each target production line by encoding each of a plurality of target production lines;

obtaining a process code corresponding to each production process by encoding each production process in each target production line;

constructing a plurality of initial adaptation schemes based on the production line code and process code of each of the plurality of target production lines and the production line adaptation instruction received by the processor of the second server;

performing multiple rounds of iterative updates on the plurality of initial adaptation schemes to determine the target adaptation scheme based on a preset algorithm; comprising:

acquiring historical monitoring data of each production process on each target production line;

determining evaluation parameters for each of the plurality of initial adaptation schemes based on the historical monitoring data;

determining a plurality of first candidate adaptation schemes from the plurality of initial adaptation schemes based on the evaluation parameters;

determining a plurality of second candidate adaptation schemes by performing a first transformation or a second transformation on the plurality of first candidate adaptation schemes;

taking the plurality of first candidate adaptation schemes and the plurality of second candidate adaptation schemes in this round of iterations as the initial adaptation schemes for a next round, and continuing the iterative update until preset conditions are met, and determining the target adaptation scheme;

obtaining an adaptation result by adapting the plurality of target production lines based on the target adaptation scheme;

receiving and processing, by the sensor network platform, which is configured as a communication network and a gateway for the management platform to interact with the object platform, the production process adaptation instructions, and sending the processed production process adaptation instructions to the object platform corresponding to the consistent idle production line in a one-to-one correspondence; and receiving, by the object platform, which is configured as a production line device to perform manufacturing and a production line sensor to perform data acquisition, the production process adaptation instructions to complete configuration.

2. The method of claim 1, wherein the service platform adopts a centralized arrangement, and the centralized arrangement means that a platform uniformly receives data, uniformly processes data and uniformly sends data; the management platform adopts a front sub-platform arrangement, the front sub-platform arrangement means that the management platform is provided with a main platform and a plurality of sub-platforms, control information and parameter configuration information of the object platform are transmitted from the main platform to the sub-platforms, and perception information is transmitted from the sub-platforms to the main platform; the sensor network platform adopts a rear sub-platform arrangement, the rear sub-platform arrangement means that the sensor network platform is provided with a main platform and a plurality of sub-platforms, the control information and the parameter configuration information of the object platform are transmitted from the main platform to the sub-platforms, and the perception information is transmitted from the sub-platforms to the main platform; and the management platform disassembles the production line adaptation instruction into the plurality of production process adaptation instructions and performs production line matching in the main platform of the management platform, when the consistent idle production line is matched, the plurality of production process adaptation instructions are sent to different sub-platforms of the management platform, the sub-platforms of the management platform correspondingly send the received production process adaptation instructions to the sub-platforms of the sensor network platform, the sub-platforms of the sensor network platform independently receive and process a production process adaptation instruction, and then send the production process adaptation instruction to the main platform of the sensor network platform for storage processing, and the main platform of the sensor network platform sends each processed production process adaptation instruction to the object platform corresponding to the main platform of the sensor network platform.

3. The method of claim 1, wherein when the management platform does not match the idle production line that is consistent with the production line required by the production item, the management platform also calculates a first matching ratio between the production line required for the production item and all idle production lines, screens an idle production line with a highest first matching ratio and obtain a missing production process of the idle production line, then, matches the production process adaptation instruction corresponding to the missing production process of the idle production line with the remaining idle production lines, then, screens out the information of the idle production line with the highest matching ratio and matching results of the missing production process in the remaining idle production lines to the service platform, and sends the production process adaptation instruction that is successfully matched to the object platform via the sensor network platform to complete the configuration; the service platform stores and processes the information of the idle production line with the highest matching ratio and the matching results of the missing production process in the remaining idle production lines, and sends the information of the idle production line with the highest matching ratio and the matching results of the missing production process in the remaining idle production lines to the user platform, and the user platform is used for displaying screening results and the matching results to the user; and the management platform calculates a first matching ratio between the production line required by the production item and the idle production line including: matching all the production process adaptation instructions of the production line required by the production item with all the production processes of the idle production line that need to calculate the first matching ratio, and obtaining the first matching ratio by dividing a number of the production process adaptation instruction that is successfully matched by a total number of the production process adaptation instructions of the production line required by the production item.

4. The method of claim 3, wherein when a plurality of idle production lines with the highest first matching ratio are screened by the management platform, the management platform calculates a second matching ratio of the missing production process of each idle production line with the highest first matching ratio for in the production processes of the remaining idle production lines, and the management platform only sends the information of the idle production line with the second highest matching ratio and the matching results of the missing production process in the remaining idle production lines to the service platform; and the management platform calculates the second matching ratio of the missing production process of each idle production line with the highest first matching ratio in the production processes of the remaining idle production line including: matching the production process adaptation instructions of the missing production process of an idle production line with the highest first matching ratio for which the second matching ratio needs to be calculated with the production processes of the remaining idle production lines, and obtaining the second matching ratio by dividing a number of the production process adaptation instruction of the missing production processes that is successfully matched by a total number of the production process adaptation instructions of the missing production process corresponding to the idle production line with the highest first matching ratio.

5. The method of claim 4, wherein when the management platform calculates that there are a plurality of idle production lines with the highest second matching ratio, the management platform calculates a sum of distances from the idle production line where the missing process is located for each idle production line with the highest second matching ratio to the idle production line with the highest second matching ratio, and the management platform only sends the information of the idle production line with a smallest sum of distances and the second highest matching ratio and the matching results of the missing production process in the remaining idle production lines to the service platform.

6. The method of claim 1, wherein the production process adaptation instruction includes a device adaptation instruction of each production line device in the production process in the production line corresponding to the production item and a sensor adaptation instruction of each production line sensor.

7. The method of claim 1, wherein after the object platform receives the production process adaptation instruction to complete the configuration, the object platform sends the perception information to the management platform through the sensor network platform; the management platform receives and processes the perception information sent by the object platform, and verifies whether the perception information corresponding to all the production process adaptation instructions has been received within a set time interval after sending the production process adaptation instruction, and sends proofreading results to the service platform; the service platform receives and processes the proofreading results, and feeds the proofreading results back to the user platform; and the user platform is used for displaying the proofreading results to the user.

8. A system for implementing a production line adaptation method based on an Industrial Internet of Things, comprising a user platform, a service platform with a centralized arrangement, a management platform with a front sub-platform arrangement, a sensor network platform with a rear sub-platform arrangement, and an object platform that interact in sequence; wherein the centralized arrangement means that a platform uniformly receives data, uniformly processes data and uniformly sends data; the front sub-platform arrangement means that the management platform is provided with a main platform and a plurality of sub-platforms, control information and parameter configuration information of the object platform are transmitted from the main platform to the sub-platforms, and perception information is transmitted from the sub-platforms to the main platform, the rear sub-platform arrangement means that the sensor network platform is provided with a main platform and a plurality of sub-platforms, the control information and the parameter configuration information of the object platform are transmitted from the main platform to the sub-platforms, and the perception information is transmitted from the sub-platforms to the main platform;

the user platform, which is configured as a terminal device that interacts with a user, receives information input by the user, processes the information and sends the information to the service platform, and displays the information sent by the service platform to the user; and the user platform generates a production line adaptation instruction according to production line adaptation information of a production line required for a production item input by the user and sends the production line adaptation instruction to the service platform; comprising:

converting production item data input by the user into computer operation code to generate the production line adaptation instruction by a processor of the terminal device, wherein the production line adaptation information includes the production item data;

the service platform, which is configured as a first server, receives the information sent by the user platform, stores and processes the information, and sends the information to the management platform, obtains the information required by the user from the management platform, stores and processes the information, and sends the information to the user platform; and the service platform receives the production line adaptation instruction sent by the user platform, stores and processes the production line adaptation instruction, and sending the production line adaptation instruction to the management platform;

the management platform, which is configured as a second server, receives and stores the information sent by the service platform, controls the object platform to perform parameter configuration, generates an instruction to control operation of the object platform, and receives and stores perception information sent by the object platform; and the management platform receives and stores the production line adaptation instruction, disassembles the production line adaptation instruction into a plurality of production process adaptation instructions, then, according to the production process adaptation instructions, matches the production line required the production item input by the user with production process of an idle production line in the production line stored in the management platform, if a consistent idle production line is matched, the management platform sends the production process adaptation instructions to the sensor network platform corresponding to the idle production line, if the consistent idle production line is not matched, the management platform generates matching failure information and feeds the matching failure information back to the user platform through the service platform; comprising:

generating a target adaptation scheme based on the production line adaptation instruction received by a processor of the second server, comprising:

obtaining a production line code corresponding to each target production line by encoding each of a plurality of target production lines;

obtaining a process code corresponding to each production process by encoding each production process in each target production line;

constructing a plurality of initial adaptation schemes based on the production line code and process code of each of the plurality of target production lines and the production line adaptation instruction received by the processor of the second server;

performing multiple rounds of iterative updates on the plurality of initial adaptation schemes to determine the target adaptation scheme based on a preset algorithm, comprising:

acquiring historical monitoring data of each production process on each target production line;

determining evaluation parameters for each of the plurality of initial adaptation schemes based on the historical monitoring data;

determining a plurality of first candidate adaptation schemes from the plurality of initial adaptation schemes based on the evaluation parameters;

determining a plurality of second candidate adaptation schemes by performing a first transformation or a second transformation on the plurality of first candidate adaptation schemes;

taking the plurality of first candidate adaptation schemes and the plurality of second candidate adaptation schemes in this round of iterations as the initial adaptation schemes for a next round, and continuing the iterative update until preset conditions are met, and determining the target adaptation scheme;

obtaining an adaptation result by adapting the plurality of target production lines based on the target adaptation scheme;

the sensor network platform is configured as a communication network and a gateway for the management platform to interact with the object platform; and the sensor network platform receives and processes the production process adaptation instructions, and sends the processed production process adaptation instructions to the object platform corresponding to the consistent idle production line in a one-to-one correspondence; and the object platform, which is configured as a production line device to perform manufacturing and a production line sensor to perform data acquisition, receives parameter configuration information sent by the management platform to implement configuration, receives an instruction operation of the management platform, and sends the perception information to the management platform through the sensor network platform; and the object platform receives the production process adaptation instructions to complete configuration.

* * * * *